United States Patent
Tunali et al.

(12) 
(10) Patent No.: US 6,799,260 B1
(45) Date of Patent: Sep. 28, 2004

(54) DYNAMIC STORAGE MANAGEMENT

(75) Inventors: Omer Tunali, Ankara (TR); Ismail Dalgic, Sunnyvale, CA (US); David C. Lee, Charlottesville, VA (US); Randolph E. Harr, Los Altos, CA (US)

(73) Assignee: Intransa, Inc., San Jose, CA (US)

( * ) Notice: Subject to any disclaimer, the term of this patent is extended or adjusted under 35 U.S.C. 154(b) by 224 days.

(21) Appl. No.: 10/113,902

(22) Filed: Mar. 29, 2002

Related U.S. Application Data

(60) Provisional application No. 60/280,588, filed on Mar. 30, 2001.

(51) Int. Cl.[7] ............................................. G06F 12/00

(52) U.S. Cl. ...................................... 711/170; 711/100

(58) Field of Search ................................. 711/100, 170

(56) References Cited

U.S. PATENT DOCUMENTS

| | | | | |
|---|---|---|---|---|
| 5,802,069 A | * | 9/1998 | Coulson | ...................... 714/718 |
| 5,802,341 A | * | 9/1998 | Kline et al. | .................. 711/209 |
| 2004/0073763 A1 | * | 4/2004 | Dageville et al. | ........... 711/170 |

* cited by examiner

*Primary Examiner*—Kevin Verbrugge
(74) *Attorney, Agent, or Firm*—Dorsey & Whitney LLP

(57) ABSTRACT

Apparatus and methods for managing storage. A storage system may receive a request from a host, for example, to allocate n blocks of storage. The storage system may allocate m blocks of physical storage, where m<n, and indicate that the request completed successfully. In various embodiments, m>zero (0) or m=zero (0). The storage system may receive a request to access a block j of the requested blocks of storage, m<j<n, and accessing the block j, in response to the request to access. Allocating the physical storage may include allocating m blocks of physical storage encompassing the block j. After the allocating, the storage system may receive a request to access a block j of the requested blocks of storage, m<j<n, access the block j and indicate that the request to access completed successfully.

17 Claims, 3 Drawing Sheets

Unallocated Blocks

Allocated Blocks

DYNAMIC STORAGE MANAGEMENT

BENEFIT APPLICATIONS

This application claims the benefit of U.S. Provisional Patent Application No. 60/280,588, entitled, "A Virtual Storage Network," naming as inventors David C. Lee et al., filed on March 30, 2001, and assigned to Intransa, Inc. of Sunnyvale, Calif. U.S. Provisional Patent Application No. 60/280,588 is incorporated herein by reference.

This invention relates to host computers and memory management. More particularly, this invention relates to a storage system's managing blocks of storage that a host requests.

BACKGROUND OF THE INVENTION

In prior art systems, a host computer may request an amount of storage space from a storage element or storage system. The element or system allocates the entirety of the space requested, and the host computer manages the space it requested. Requesting space for a file system and then building a file system in that space is an example.

Not uncommonly, the host administration (software or a human administrator) miscalculates the amount of space necessary. Where the miscalculation is an overestimation, nothing need be done, even though resources may be inefficiently allocated. Where, however, the miscalculation is an underestimation, the host needs to increase the size of space available to it.

To meet the increased demand for storage, the host decides to increase the size of the file system. To expand the file system, the host first quiesces the file system and then backs up the data. The host takes the file system offline, increases the size of the volume/partition, constructs a new file system spanning the increased volume/partition size and brings online the new file system. The creation of the new file system destroys the old file system and the data resident therein. The host, therefore, restores the destroyed data from the back up. The expanded file system and the old data are now ready to meet the demand of applications for increased storage.

Taking the file system offline causes any access in progress to fail. Even were an access to block indefinitely while the file system is expanding and unavailable (a configuration not admitted to be in the art), the delay would be expected to be on the order of tens of minutes—an eternity in computer time. Where a human administrator must notice the host's request for a larger volume/partition/file system, the time may increase to hours.

Accordingly, there is a need for data storage that efficiently manages storage resources, dynamically expanding and contracting according to storage usage. Even more, there is a need for efficient managed storage that dynamically expands and contracts within an insignificant amount of time computer-wise.

These and other goals of the invention will be readily apparent to one of skill in the art on reading the background above and the description below.

SUMMARY

Herein are taught apparatus and methods for managing storage. A storage system may receive a request from a host, for example, to allocate n blocks of storage. The storage system may allocate m blocks of physical storage, where m<n, and indicate that the request completed successfully. In various embodiments, m>zero (0) or m=zero (0).

The storage system may receive a request to access a block j of the requested blocks of storage, m<j<n, and access the block j, in response to the request to access.

Allocating the physical storage may include allocating m blocks of physical storage encompassing the block j. After the allocation, the storage system may receive a request to access a block j of the requested blocks of storage, m<j<n. The system may access the block j and indicate that the request to access completed successfully.

Alternatively, before allocating, the storage system may receive a request to access a block j of the requested blocks of storage, m<j<n. The storage system may then allocate k blocks of physical storage encompassing the block j and access the block j and indicate that the request to access completed successfully.

The requested blocks may be virtual. M may be predetermined, dynamically determined or empirically determined.

In various embodiments, the invention may be a computer-readable memory containing a computer program for causing a storage processor to assist managing storage, a storage processor including the memory or a computer system including a host for requesting allocation of storage blocks and for requesting access to the requested blocks of storage, the storage processor and a storage element.

BRIEF DESCRIPTION OF THE DRAWINGS

FIG. 3A illustrates Changed_Size>Requested_Size, while

DESCRIPTION OF THE INVENTION

Figure 1:
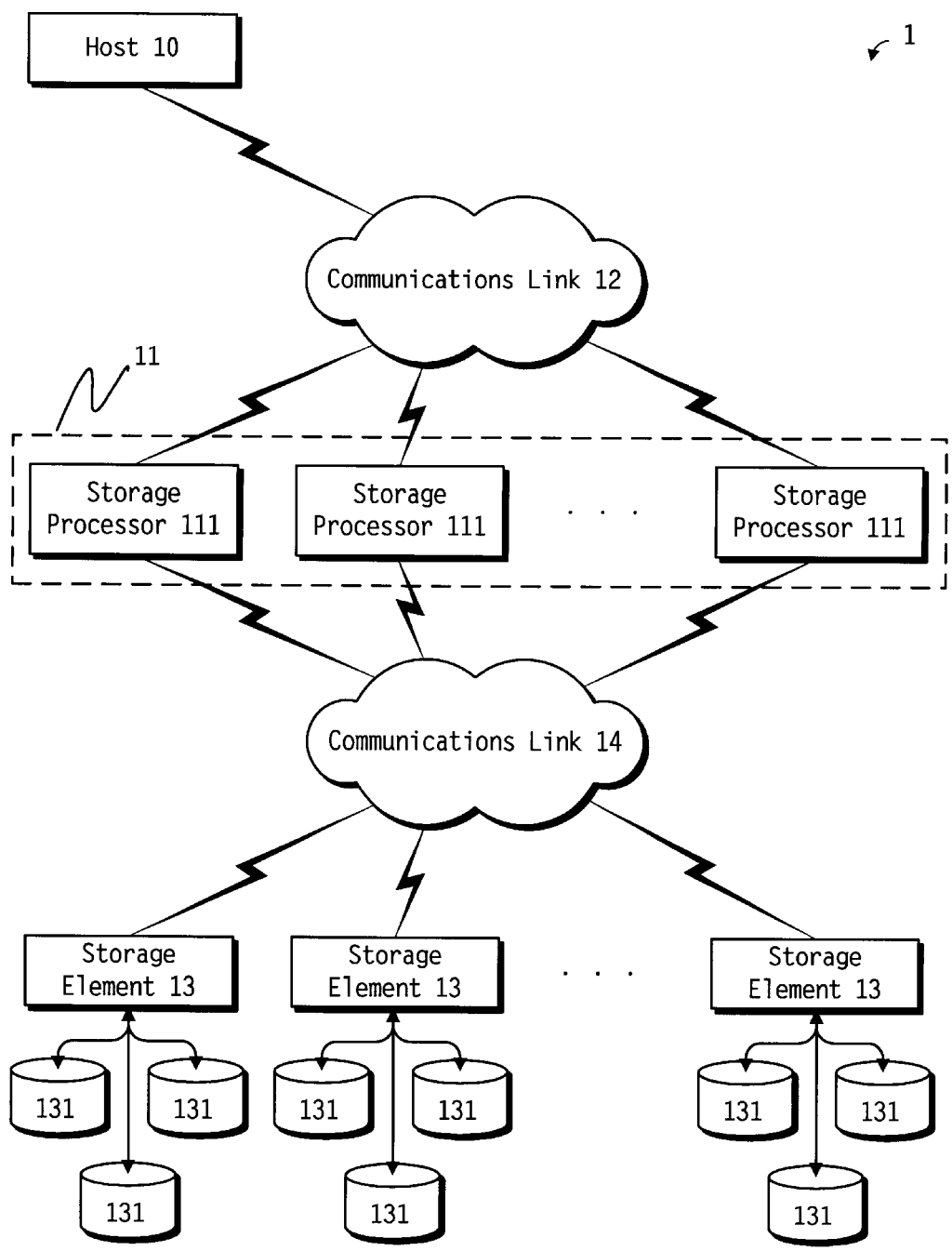
FIG. 1 illustrates a computer system 1 incorporating an embodiment of the invention.

FIG. 1 illustrates a computer system 1 incorporating an embodiment of the invention. The system 1 includes a host 10, a storage system 11, one or more storage elements 13 and communications links 12, 14. The links 12 communicatively couple the host 10 to the storage system 11, and the link 14 communicatively couples the storage system 11 to the storage elements 13. The storage system 11 may be a storage processor or may be (part of) a storage area network.

An application on, administrative software for or an administrator of the host 10 may determine a maximum size, Requested_Size, of a block storage device for the application. The host 10 or administrator notifies the storage system 11 of the determined maximum size.

Figure 2A:
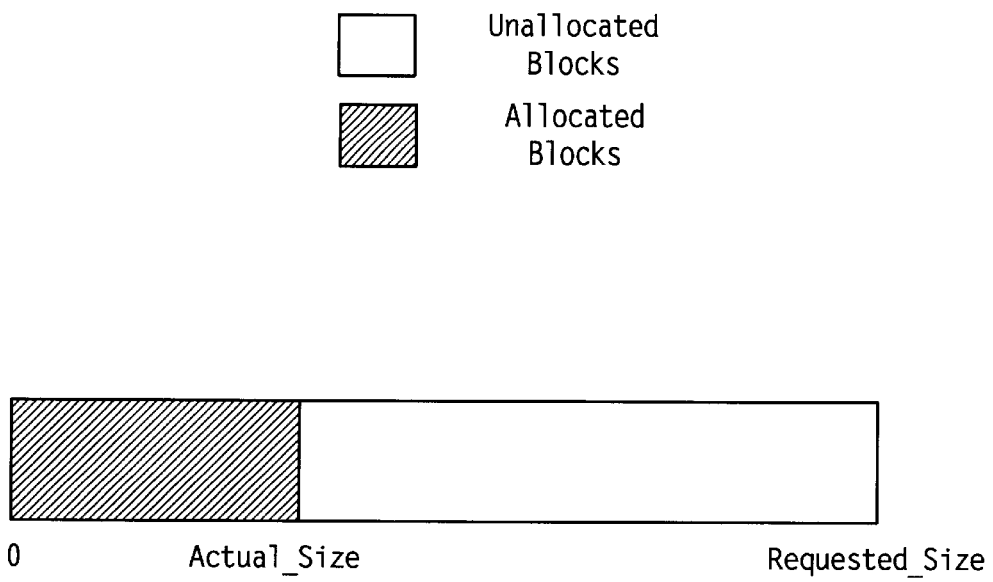
FIG. 2A illustrates the actual allocation of the physical blocks versus the requested number of physical blocks.

The storage system 11 may allocate a set of physical blocks numbering Actual_Size, Actual_Size<Requested_Size, and return an identifier to the host 10 or administrator that allows the host 10 to access the allocated storage. FIG. 2A illustrates the actual allocation of the physical blocks versus the requested number of physical blocks.

In the course of its normal operations, the host 10 may access all of the Actual_Size blocks. Because all of these blocks were allocated on the creation of the volume/partition, the storage system does not perform processing as described herein to enable access to unallocated blocks.

Figure 2B:
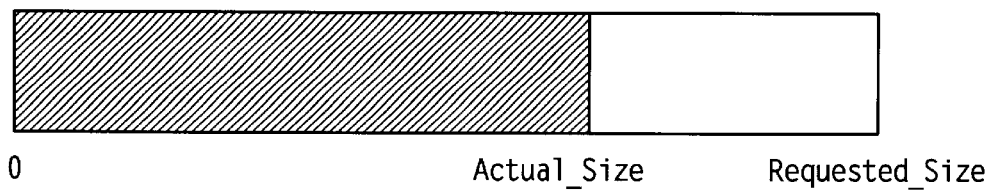
FIG. 2B illustrates the allocation of more physical blocks.

Where, however, Actual_Size<Requested_Size and the host accesses a block j, Actual_Size $\leq$ j <Requested_Size, the storage system allocates additional physical blocks numbering more, j−Actual_Size≦more≦Requested_Size−Actual_Size. The additional blocks are at least the blocks Actual_Size+1 through j (using one indexing). This resets Actual_Size to Actual_Size+more. The storage system then handles and responds to the access of block j. FIG. 2B illustrates the allocation of more physical blocks.

The storage system may maintain a table mapping virtual blocks to physical blocks. The original allocation of Actual_Size blocks is the first entry in the table, mapped to the address of the first of the contiguous physical blocks. Table I illustrates this example.

TABLE I

| Virtual Block Number | Physical Block Number |
| --- | --- |
| Actual_Size | 4096 |

The subsequent allocation of more blocks causes another entry in the table, mapping the more virtual blocks to their associated (contiguous) physical blocks. Table II illustrates this example.

TABLE II

| Virtual Block Number | Physical Block Number |
| --- | --- |
| Actual_Size | 4096 |
| more | 65536 |

In another embodiment of the invention, in response to a request for storage space, the storage system 11 may not allocate any physical blocks. Rather, the storage system 11 waits until the host 10 accesses a block j to allocate storage for block j.

For example, the storage system 11 may allocate only fixed-sized collections of blocks ("chunks"). System management (software or an administrator) may determine the fixed size.

The storage system 11 may maintain a mapping of chunks of virtual blocks to chunks of physical blocks. A table may implement such a mapping. Each time the host 10 accesses a block j, the storage system 11 may determine whether it has already allocated a chunk encompassing the virtual block j. If it has, it translates the virtual chunk to a physical chunk and accesses the physical block corresponding to the virtual block j. Where, for example, the virtual block j is the $3^{rd}$ block in the virtual chunk, the corresponding physical block may be the 3rd block in the physical chunk.

If the storage system 11 has not yet allocated a chunk encompassing the block j, it may then allocate such a physical chunk and map the physical chunk to the virtual chunk in, for example, the table.

With the physical chunk allocated and a mapping in place, the storage system 11 may access the physical block corresponding to the virtual block j.

An example of this algorithm follows:
if (the chunk containing the block j is already allocated
then
  Translate the block address of j into a physical address.
else
  Allocate a new physical chunk
  Enter the virtual chunk and its physical location into the table.
end
Access the physical block within the physical chunk, using an offset equivalent to the offset of the block j in the virtual block.

The storage system may map virtual and physical blocks in pairs, even in a table. One number is the virtual chunk index, and the other is the physical location for the chunk. A table may be sorted on the virtual chunk index. Table III illustrates a mapping.

TABLE III

| Virtual Chunk Number | Physical Chunk Location |
| --- | --- |
| 4 | 7 |
| 6 | 3 |
| 57 | 9 |
| 68 | 456 |

The storage system 11 may delete chunks which the host 10 no longer uses. For example, if the storage system 11 is aware of the protocol the host 10 uses to deallocate storage within the storage space, the system 11 may monitor the host's use of the protocol and deallocate any physical blocks or chunks whose counterparts the host 10 no longer uses.

If the storage system 11 is unaware of the protocol, an agent (not shown) of the storage system 11 may execute in the background on the host 10, monitoring the deletion of virtual blocks. The agent may inform the system 11 of the deletions, perhaps periodically.

Figure 3A:
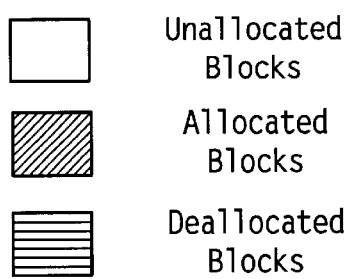
Figure 3A:
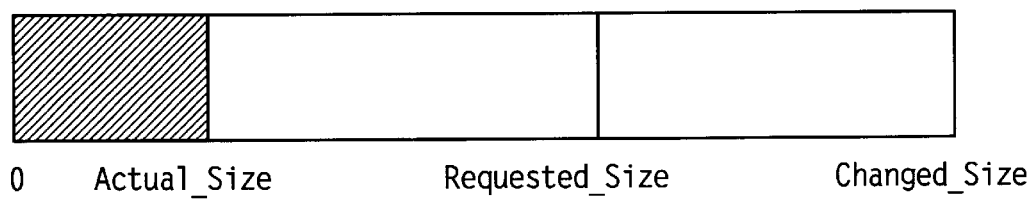

After initially requesting storage space of Requested_Size physical blocks, the host 10 may subsequently request that the storage space size be changed to Changed_Size, Changed_Size<>Requested_Size. FIG. 3A illustrates Changed_Size>Requested_Size. The storage system 11 may allocate none, some or all of the additional Changed_Size−Requested_Size blocks.

Figure 3B:
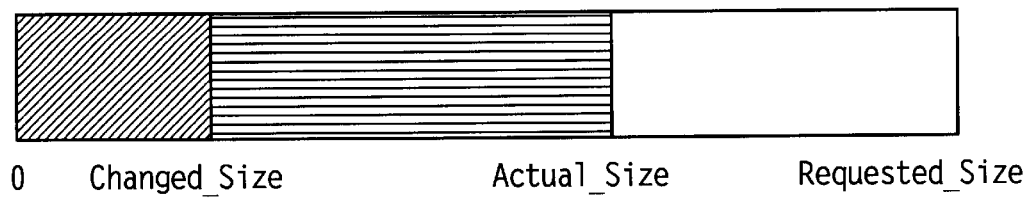
FIG. 3B illustrates Changed_Size<Requested_Size.

FIG. 3B illustrates Changed_Size <Requested_Size. The storage system 11 may consider Changed_Size<Requested_Size an instruction to deallocate storage.

Herein has been taught the management of storage. The described embodiments are by way of example and not limitation.

Modifications to the invention as described will be readily apparent to one of ordinary skill in the art. For example, the blocks allocated may be contiguous or non-contiguous physical blocks, although non-contiguous blocks increase the size of a mapping table. As another example, the fixed number of blocks allocated may be one (1).

As yet another example, where requested storage is initially allocated after receiving a request to access that storage, additional storage may be subsequently allocated before receiving a request to access that additional storage. Likewise, where requested storage is initially allocated before receiving a request to access that storage, additional storage may be subsequently allocated after receiving a request to access the additional storage.

What is claimed is:

1. A method for managing storage in a block-based storage system, the method comprising:
   receiving a request to allocate n blocks of storage;
   then allocating m blocks of physical storage, m<n; and
   indicating that the request completed successfully.

2. The method of claim 1, wherein m>zero (0).

3. The method of claim 1, wherein m=zero (0).

4. The method of claim 1, further comprising the step of receiving a request to access a block j of the requested blocks of storage, m<j<n.

5. The method of claim 1, further comprising the step of receiving a request to access a block j of the requested blocks of storage, m<j<n; and accessing the block j in response to the request to access.

6. The method of claim 1, where in the step of allocating comprises allocating m blocks of physical storage encompassing the block j; and wherein, after the step of allocating, the following steps are performed:

receiving a request to access a block j of the requested blocks of storage, m<j<n;

accessing the block j; and indicating that the request to access completed successfully.

7. The method of claim 1, wherein before the step of allocating the following step is performed receiving a request to access a block j of the requested blocks of storage, m<j<n; and wherein the step of allocating comprises allocating m blocks of physical storage encompassing the block j; and wherein, after the step of receiving a request to access, the following steps are performed accessing the block j; and indicating that the request to access completed successfully.

8. The method of claim 1, wherein the blocks requested blocks are virtual.

9. The method of claim 1, wherein m is predetermined.

10. The method of claim 1, wherein m is dynamically determined.

11. The method of claim 1, wherein m is empirically determined.

12. The method of claim 1, further comprising the step of dynamically deallocating some of the m blocks of physical storage.

13. The method of claim 1, further comprising the steps of observing the deallocation of blocks of virtual storage; and deallocating corresponding blocks of the allocated physical storage in response to the observation.

14. The method of claim 13, wherein the step of observing comprises executing an agent on a host, the agent observing the deallocation of blocks of virtual storage on the host and communicating those observations to a storage system.

15. A computer-readable memory containing a computer program for causing a storage processor to assist managing storage by receiving a request to allocate n blocks of storage;

allocating m blocks of physical storage, m<n, in response to the request; and indicating that the request completed successfully.

16. A storage processor comprising:

the memory of claim 15; and a CPU, coupled to the memory, for executing the program in the memory.

17. A computer system comprising:

a host for requesting allocation of storage blocks and for requesting access to the requested blocks of storage;

a storage processor of claim 16, communicatively coupled to the host; and a storage element, communicatively coupled to the storage processor.

* * * * *